(12) United States Patent
Chun et al.

(10) Patent No.: US 8,257,092 B2
(45) Date of Patent: Sep. 4, 2012

(54) REDUNDANT CLOCK CHANNEL FOR HIGH RELIABILITY CONNECTORS

(75) Inventors: Sungjun Chun, Austin, TX (US); Daniel M. Dreps, Georgetown, TX (US); Dierk Kaller, Schoenaich (DE); Rohan U. Mandrekar, Austin, TX (US); Lei Shan, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/946,328

(22) Filed: Nov. 15, 2010

(65) Prior Publication Data
US 2012/0120577 A1 May 17, 2012

(51) Int. Cl.
*H01R 12/00* (2006.01)

(52) U.S. Cl. .......... 439/55; 439/637; 439/951; 710/301; 257/685; 257/691

(58) Field of Classification Search .................. 439/637, 439/55, 951; 710/301; 257/685, 691, 692, 257/693
See application file for complete search history.

(56) References Cited

U.S. PATENT DOCUMENTS

| | | | |
|---|---|---|---|
| 5,181,855 A * | 1/1993 | Mosquera et al. .............. | 439/74 |
| 6,253,284 B1 * | 6/2001 | Hsu ............................... | 711/115 |
| 6,970,045 B1 | 11/2005 | Lichter et al. | |
| 7,058,170 B2 | 6/2006 | Brocco et al. | |
| 7,310,759 B1 | 12/2007 | Carmichael et al. | |
| 7,489,574 B2 * | 2/2009 | Lin et al. ........................ | 365/207 |
| 7,558,545 B2 | 7/2009 | Maejima | |
| 7,657,677 B2 * | 2/2010 | Huang et al. ................... | 710/100 |
| 2002/0041020 A1 * | 4/2002 | Ono et al. ...................... | 257/685 |
| 2008/0046774 A1 | 2/2008 | Hirai et al. | |
| 2008/0310235 A1 * | 12/2008 | Lin et al. ................... | 365/185.21 |
| 2009/0295448 A1 | 12/2009 | Guo et al. | |
| 2011/0289250 A1 * | 11/2011 | Li ................................. | 710/301 |

* cited by examiner

*Primary Examiner* — Gary F. Paumen
(74) *Attorney, Agent, or Firm* — Yee & Associates, P.C.; David A. Mims, Jr.

(57) ABSTRACT

A memory module configured to connect to a slot of a data processing system. A set of tabs is connected to the module and configured to electrically connect the module to the slot and to electrically connect the module to a clock of the data processing system. The set of tabs includes a first tab, a second tab, a third tab, and a fourth tab. The first tab and the second tab are opposite the third tab and the fourth tab. The first tab comprises a positive type tab, the second tab comprises a negative type tab, the third tab comprises a positive type tab, and the fourth tab comprises a negative type tab. The first and third tabs are configured to provide a first electrical connection to the clock. The second and fourth tabs are configured to provide a second electrical connection to the clock. Together, the first, second, third, and fourth tabs comprise two dual tabs.

20 Claims, 9 Drawing Sheets

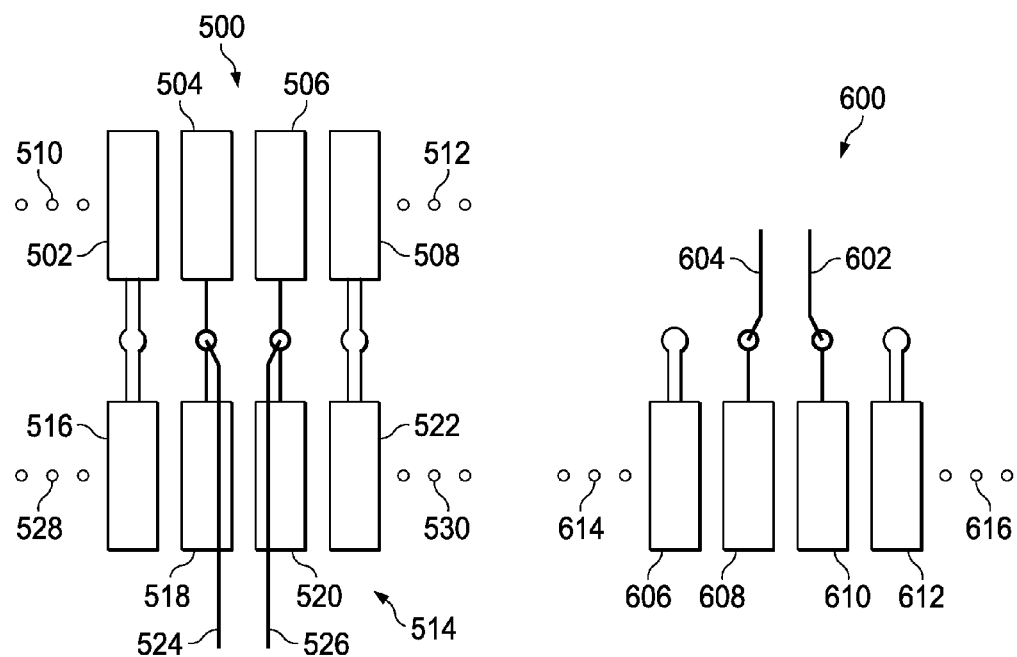
FIG. 5
FIG. 6
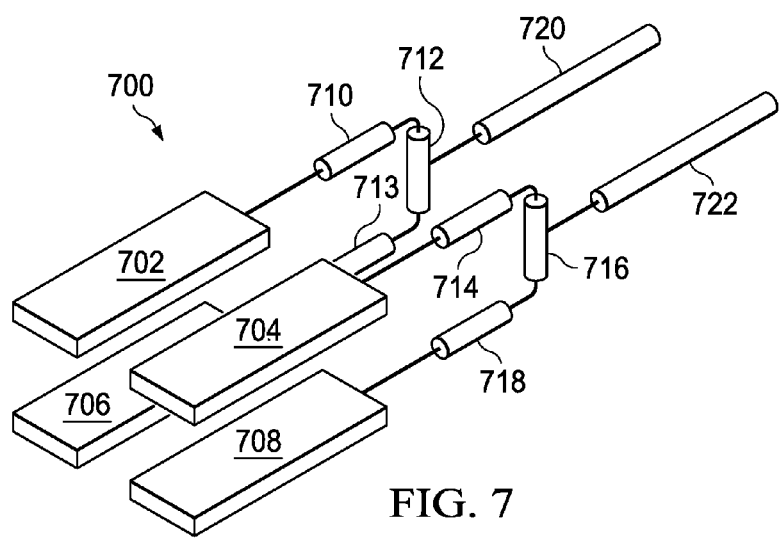
FIG. 7

| | VERTICAL EYE (mV) | | HORIZONTAL EYE (%UI) | | VERTICAL EYE (mV) | | HORIZONTAL EYE (%UI) | | VERTICAL EYE (mV) | | HORIZONTAL EYE (%UI) | |
|---|---|---|---|---|---|---|---|---|---|---|---|---|
| | MINSTUB | MAXSTUB | MINSTUB | MAXSTUB | MINSTUB | MAXSTUB | MINSTUB | MAXSTUB | MINSTUB | MAXSTUB | MINSTUB | MAXSTUB |
| 1508 | 266 | 280 | 97.5 | 98.3 | 184 | 167 | 91.9 | 92.8 | 119 | 109 | 87.2 | 88.7 |
| 1510 | 253 | 275 | 95.3 | 97.6 | 177 | 165 | 87.9 | 91.4 | 107 | 106 | 79.4 | 88.5 |
| 1512 | 245 | 244 | 97.0 | 97.2 | 142 | 115 | 92.7 | 91.9 | 103 | 76 | 89.3 | 87.3 |
| 1514 | 240 | 245 | 96.6 | 97.5 | 142 | 117 | 91.9 | 92.1 | 101 | 79 | 88.0 | 88.8 |
| 1516 | 281 | 263 | 95.0 | 96.7 | 27 | 76 | 71.1 | 89.0 | 46 | 0 | 81.2 | 53.0 |
| 1518 | 277 | 265 | 94.1 | 97.5 | 23 | 79 | 68.3 | 90.4 | 40 | 0 | 77.9 | 54.0 |
| 1520 | 247 | 254 | 93.4 | 95.2 | 45 | 77 | 62.8 | 82.5 | 62 | 9 | 80.4 | 45.7 |
| 1522 | 246 | 255 | 94.1 | 95.9 | 43 | 77 | 64.8 | 83.4 | 59 | 9 | 79.7 | 43.7 |
| 1524 | NA | 242 | NA | 97.2 | NA | 105 | NA | 90.4 | NA | 63 | NA | 87.4 |
| 1526 | NA | 243 | NA | 97.3 | NA | 107 | NA | 91.8 | NA | 66 | NA | 88.8 |
| 1528 | NA | 241 | NA | 97.0 | NA | 78 | NA | 90.0 | NA | 39 | NA | 85.2 |
| 1530 | NA | 244 | NA | 97.5 | NA | 80 | NA | 91.2 | NA | 42 | NA | 86.4 |

FIG. 15

REDUNDANT CLOCK CHANNEL FOR HIGH RELIABILITY CONNECTORS

BACKGROUND

1. Field

The disclosure relates generally to electronic connectors and more specifically to connectors between a module and a slot in a data processing system, and still more specifically to connectors for modules insertable into data processing systems, such as but not limited to dual in-line memory modules (DIMMs).

2. Description of the Related Art

As used herein, a module is a device that may include a series of integrated circuits. The module may be inserted into a slot in a component of a data processing system, such as a motherboard slot. The module may provide extra functionality to the data processing system.

An example of such a module is a dual in-line memory module (DIMM) that may be, for example, a series of dynamic random memory (DRAM) integrated circuits. Many DIMMs may be mounted on a printed circuit board and designed for use in personal computers, workstations, servers, and other data processing systems. A common, non-limiting example of a DIMM may be a "memory chip" that might be installed onto a motherboard or central processing unit (CPU) slot of a personal computer. However, DIMMs and other modules may take many different forms and may serve many different functions. Common to most DIMMs and other modules is a series of contacts, with separate electrical contacts on each side of the module.

Most modules may be removably connected to slots on a data processing system, the slots designed to receive the modules. When inserted in a slot, the series of contacts on a given module may make an electrical connection with corresponding receptors in the slot. In this manner, other components of the data processing system, such as but not limited to the CPU, might communicate with the module.

The failure rate of modules, in some instances, has been shown to be problematic over the lifetime of a variety of different data processing systems. One source of module failure may be corrosion that builds up between contacts on the module and corresponding contacts of the slot in which the module has been inserted. Corrosion can block the electrical connection, thereby creating an electrical "open," which is an electrical circuit that is not complete. Other causes for electrical opens also exist. For a module that uses an electronic clock, or which relies on an electronic clock for desired functionality, one or more electrical opens might disrupt the desired operation of the module. Accordingly, it would be advantageous to have a method and apparatus, which takes into account one or more of the issues discussed above as well as possibly other issues.

SUMMARY

According to one embodiment, a module is configured to connect to a slot of a data processing system. A set of tabs is connected to the module and configured to electrically connect the module to the slot and to electrically connect the module to a clock of the data processing system. The set of tabs includes a first tab, a second tab, a third tab, and a fourth tab. The first tab and the second tab are opposite the third tab and the fourth tab. The first tab comprises a positive type tab, the second tab comprises an negative type tab, the third tab comprises a positive type tab, and the fourth tab comprises an negative type tab. The first and third tabs are configured to provide a first electrical connection to the clock. The second and fourth tabs are configured to provide a second electrical connection to the clock. Together, the first, second, third, and fourth tabs comprise two dual tabs.

According to another embodiment, a device includes a bus, a processor connected to the bus, a clock connected to the bus, and a slot connected to at least one of the processor, the clock, and the bus. The slot is configured with a first via and a second via. The slot is further configured to receive a module comprising two dual tabs. The slot is further configured to receive the two dual tabs that comprise: a first tab, a second tab, a third tab, and a fourth tab. The first tab and the second tab are opposite the third tab and the fourth tab. The first tab comprises a positive type tab, the second tab comprises a negative type tab, the third tab comprises a positive type tab, and the fourth tab comprises a negative type tab. The slot is further configured to receive the two dual tabs such that the first tab and the third tab connect to the first via. The slot is further configured to receive the two dual tabs such that the second tab and the fourth tab connect to the second via. The slot is further configured such that fifth and sixth connections in the slot allow a first electrical connection from the first and second tabs to the clock. The slot is further configured such that seventh and eighth connections in the slot allow a second electrical connection from the third and fourth tabs to the clock.

According to another embodiment, a data processing system includes a bus, a processor connected to the bus, a clock connected to the bus, and a slot connected to at least one of the processor, the clock, and the bus. The slot is configured with a first via and a second via. The device further includes a module comprising two dual tabs inserted into the slot. The module further includes a first tab, a second tab, a third tab, and a fourth tab. The first tab and the second tab are opposite the third tab and the fourth tab. The first tab comprises a positive type tab, the second tab comprises an negative type tab, the third tab comprises a positive type tab, and the fourth tab comprises an negative type tab. The first tab and the third tab connect to the first via. The second tab and the fourth tab connect to the second via. Fifth and sixth connections in the slot electrically connect the first and second tabs to the clock. Seventh and eighth connections in the slot electrically connect the third and fourth tabs to the clock.

The features, functions, and advantages can be achieved independently in various illustrative embodiments of the present disclosure or may be combined in yet other illustrative embodiments in which further details can be seen with reference to the following description and drawings.

BRIEF DESCRIPTION OF THE SEVERAL VIEWS OF THE DRAWINGS

FIG. 5 is an illustration of a slot with surface mount tabs and vias for connection to a module, in accordance with an illustrative embodiment;

FIG. 6 is an illustration of a module with tabs and vias, in accordance with an illustrative embodiment;

FIG. 7 is an illustration of a module with tabs and vias, in accordance with an illustrative embodiment;

FIG. 15 is a table illustrating a summary of clock jitter results and vertical swings for two different slot and module configurations.

DETAILED DESCRIPTION

Figure 1:
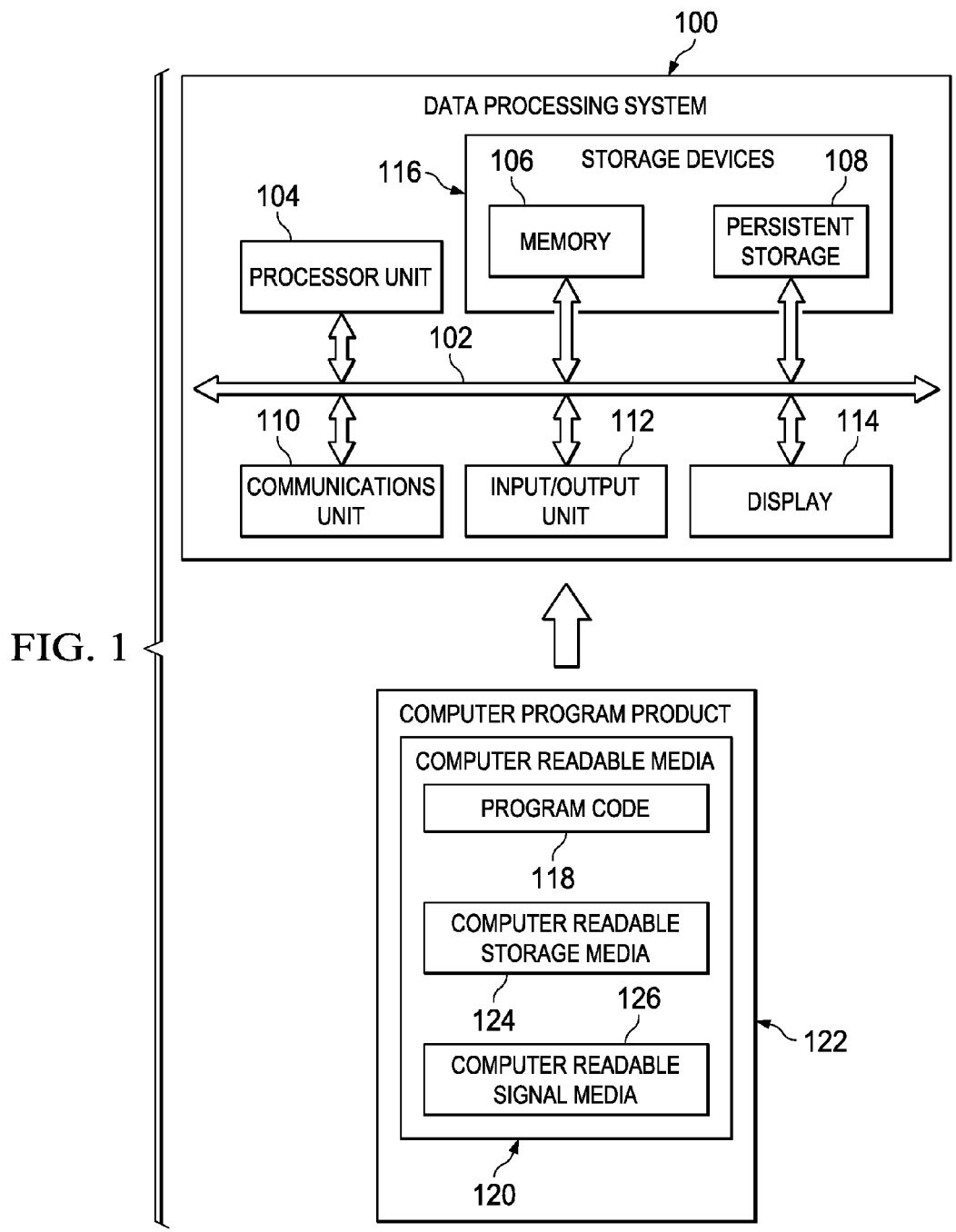
FIG. 1 is an illustration of a data processing system, in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Storage devices 116 may also be referred to as computer readable storage devices in these examples. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 118 may be omitted because the processes for the different embodiments are implemented in a hardware unit.

In still another illustrative example, processor unit 104 may be implemented using a combination of processors found in computers and hardware units. Processor unit 404 may have a number of hardware units and a number of processors that are configured to run program code 118. With this depicted example, some of the processes may be implemented in the number of hardware units, while other processes may be implemented in the number of processors.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
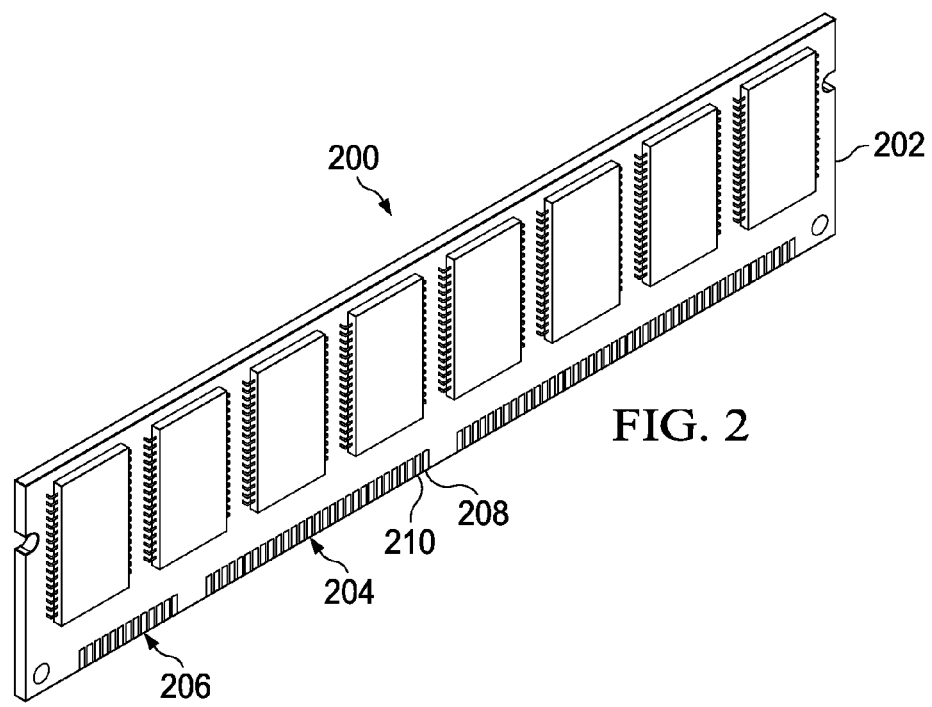
FIG. 2 is an illustration of a non-limiting example of a dual in-line memory module (DIMM), in accordance with an illustrative embodiment.

FIG. 2 is an illustration of a non-limiting example of a dual in-line memory module (DIMM), in accordance with an illustrative embodiment. DIMM 200 is a specific, non-limiting example of a module that is insertable into a data processing system slot, wherein the module is configured to enable or remove functionality for the data processing system. The embodiments are not limited to the use of a DIMM, such as DIMM 200. Generally, FIGS. 2 and 3 are presented solely as an aid to understanding an exemplary, non-limiting context of the embodiments described herein.

DIMM 200 may be used for one or more components in FIG. 1, such as but not limited to persistent processor unit 104, memory 106, persistent storage 108, communications unit 110, or input/output unit 112. DIMM 200 includes a printed circuit board 202 that might be configured to perform one or more functions when inserted into a slot of a data processing system. A non-limiting example of a function of DIMM 200 might be to provide extra random access memory (RAM) for the data processing system, though DIMM 200 could have any desired functionality. In order to facilitate electrical connection between DIMM 200 and the slot of the data processing system, DIMM 200 may be provided with one or more electrical connections 204.

Figure 3:
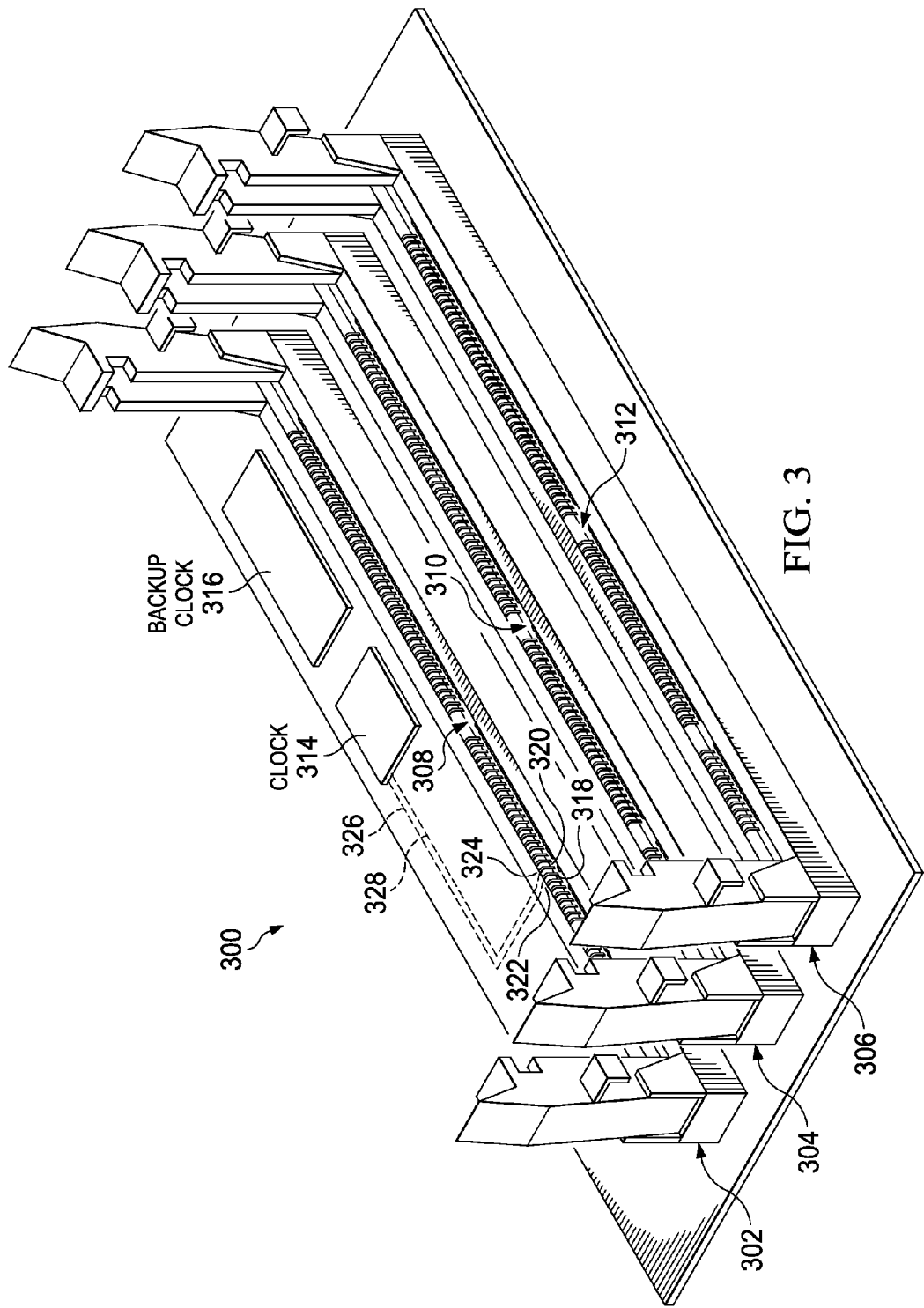
FIG. 3 is an illustration of a non-limiting example of a data processing system for receiving the DIMM shown in FIG. 2, in accordance with an illustrative embodiment.

FIG. 3 is an illustration of a non-limiting example of a data processing system for receiving the DIMM shown in FIG. 2, in accordance with an illustrative embodiment. Data processing system 300 includes one or more slots, such as slots 302, 304, and 306. One or more DIMMs, such as DIMM 200 of FIG. 2, may be inserted into one or more of slots 302, 304, or 306 of data processing system 300. Each of slots 302, 304, or 306 may include one or more connectors 308, 310, and 312, respectively, for establishing electrical connections between the connectors on the DIMM and other components of the data processing system 300. In the embodiment shown in FIG. 3, data processing system 300 is shown as a motherboard; however, the slots may be connected to any components of a data processing system, such as for example one or more of a processor, a bus, a storage medium, or any other component of a data processing system. In an embodiment, one or more of slots 302, 304, or 306 may be connected to a clock 314 of the data processing system in order to facilitate desired operation of the corresponding DIMMs, when connected.

Returning to FIG. 2, the failure rate of DIMM tabs, such as for example DIMM tab 206, has been shown in some cases to be undesirable over the lifetime of a data processing system. In some cases, DIMM tab 206 might be established as a connection to communicate with a clock 316 of a data processing system. Where operation of DIMM tab 206 uses communication with clock 316, failure of DIMM tab 206 might be quite undesirable. Similar issues might arise for other types of modules having the same or similar tabs, and is not limited to DIMMs such as DIMM tab 206. Considering FIGS. 2-4, FIG. 7, and FIG. 8 together, DIMM tab 206, as shown in FIG. 2, may be one tab among many tabs. These DIMM tabs 206 may be arranged in opposing pairs, such as shown by tabs 702, 704, 706, and 708 in FIG. 7. Thus, for example, tab 208 may correspond to tab 702 in FIG. 7 and tab 210 may correspond to tab 704 in FIG. 7. Once module 200 is inserted into a slot, such as slot 308 of FIG. 3, these DIMM tabs 206 may form electrical connections with corresponding paired receiving tabs, such receiving tab 318 paired with receiving tab 322 and receiving tab 320 paired with receiving tab 324 in FIG. 3. In a specific example, once module 200 is inserted into slot 308 of FIG. 3, tab 208 may connect to receiving tab 318 in FIG. 3 and tab 210 connect to receiving tab 320 in FIG. 3. Corresponding tabs on the opposite side of FIG. 2, directly opposite tab 208 and tab 210, will connect to receiving tab 322 and receiving tab 324, respectively. In turn, the receiving tabs, such as receiving tabs 318, 320, 322, and 324, may electrically connect to ports, vias, or other wiring that is electrically connected to other parts of data processing system 300. Examples of ports, vias, or other wiring are shown, for example, by port 810 and port 812 of FIG. 8. In any case, receiving tabs 318, 320, 322, and 324 may use such ports, vias, or other wiring to establish an electrical connection to clock 314, such as shown by electrical connection 326 and electrical connection 328. Electrical connection 326 may electrically connect receiving tab 318 and/or receiving tab 322 to clock 314. Likewise, electrical connection 328 may electrically connect receiving tab 324 and/or receiving tab 320 to clock 314. These two electrical connections may also be shown in FIG. 4, such as at electrical connection 420 and electrical connection 422 in FIG. 4.

Failover mechanisms have been proposed for electronic clock failover, such as in case of a failure in the connection between DIMM tab 206 and a slot, such as slots 302, 304, or 306 of FIG. 3. In an embodiment, a complex mechanism may be used to detect an early potential failure in a communication with the clock 314, and then sending back channel signals to the data processing system to invoke a clock fail-over procedure. In this case, a primary clock, such as clock 314, might be taken off line, and a switch takes place to a new path to a backup clock 316. However, there exist many possibilities for this electronic failover mechanism to be "fooled," as described further below, in the sense that a failure is detected, but not actually present, or that a potential failure is not detected ahead of time, but is present. In the case of a false positive, where a failure is detected but not actually present, unnecessary repairs might be performed, or functionality or efficiency of the DIMM performance might be inhibited. In the case of a false negative, such as when a pending failure is not detected, a desired failover procedure might not be implemented in a desirable amount of time. Similar issues might arise for other types of modules having the same or similar tabs, and is not limited to DIMMs such as DIMM 206.

In an embodiment, one possible common source of a failure of these failover mechanisms, resulting in the failover mechanism being "fooled," is local corrosion between individual tabs in the DIMM, such as DIMM tab 206, and the corresponding connection in the relevant slot of the data processing system. Corrosion increases the contact resistance between the DIMM tab 206 and the corresponding connection, possibly to the point where an electrical open might occur. An electrical open is a break in an electrical circuit. In an embodiment, the result of an electrical open is a failure in communication between part or all of a DIMM and its corresponding slot. As a result, communication between the DIMM and the data processing system might be disrupted. Similar issues might arise for other types of modules having the same or similar tabs, and is not limited to DIMMs such as DIMM 206.

The embodiments described herein relate to simple, effective failover mechanisms between a module tab and corresponding contacts in a corresponding slot of a data processing system. The embodiments described herein may further, specifically relate to providing redundant clock channels for modules that are designed to have a high reliability in order to minimize the probability of a disruption in communication between the module and a clock of the data processing system.

In a particular, non-limiting embodiment, a dual point to point clock path may be provided. For example, DIMM 200 of FIG. 2 might be provided with certain tabs, such as DIMM tab 206, that might have two dual tabs configured to communicate with one or more vias that communicate with connections in a slot, such as slots 302, 304, and 306. In this manner, the probability of a disruption in communication between DIMM 200 and a clock 314 of the data processing system might be minimized. Similar issues might arise for other types of modules having the same or similar tabs, and is not limited to DIMMs such as DIMM 206. These embodiments are described further with respect to FIGS. 4 through 15 and elsewhere herein.

Figure 4:
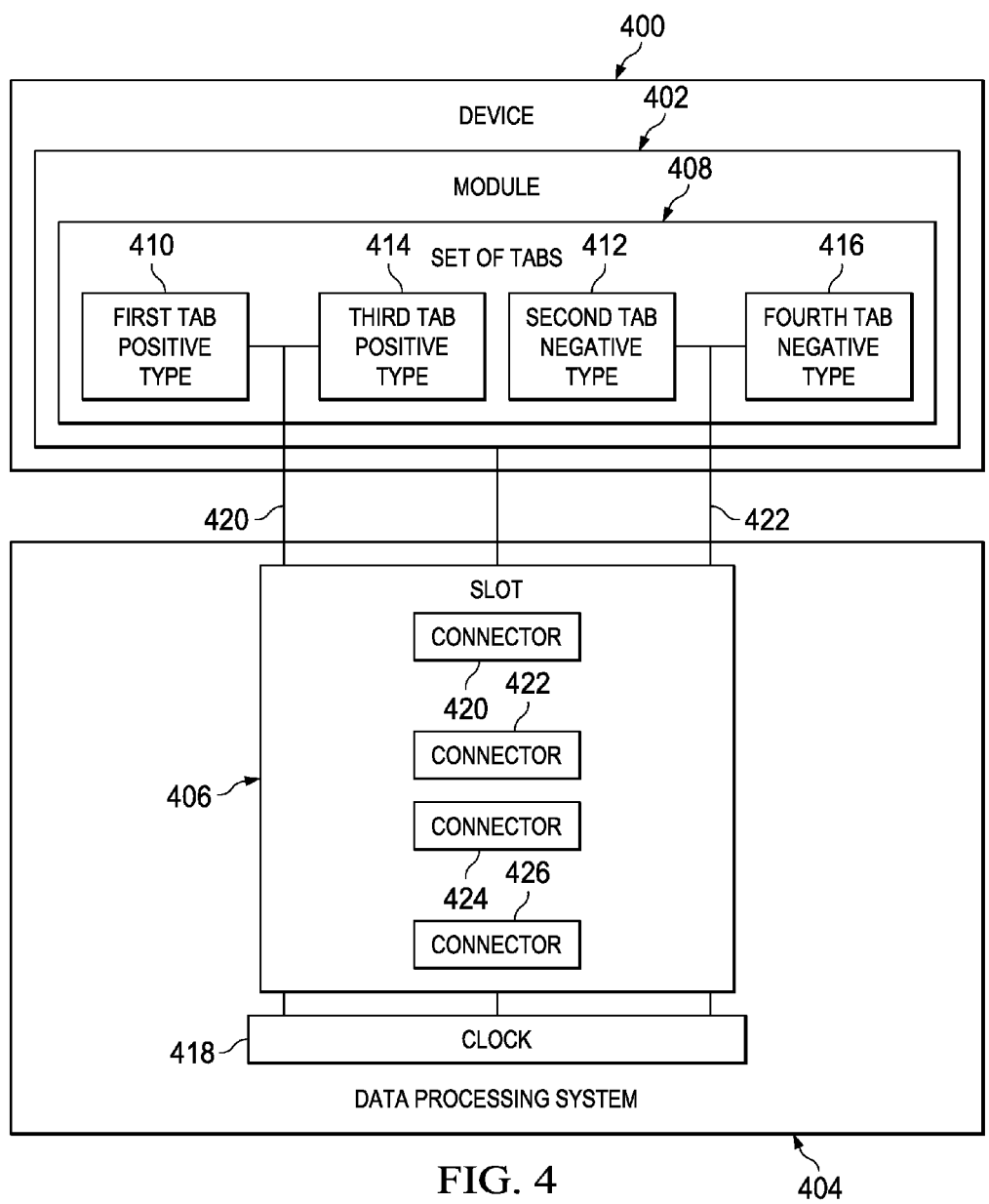
FIG. 4 is an illustration of a block diagram of a device including a module and slot system, in accordance with an illustrative embodiment.

FIG. 4 is an illustration of a block diagram of a device including a module and slot system, in accordance with an illustrative embodiment. Module 402 may be, in one non-limiting embodiment, DIMM 200 of FIG. 2. Data processing system 404 may be, in one embodiment, data processing system 300 of FIG. 3. However, the embodiments are not limited to DIMMs and may be used in other types of data processing systems. Therefore, module 402 might take many different forms, such as but not limited to peripheral component interconnect (PCI) cards, PCI express (PCIe) cards, or other module or cards. Accordingly, module 402 may be any type of card or module that might be connected to a slot of a data processing system for the purpose of providing or removing functionality to that data processing system, or even a second data processing system connected to that data processing system. Data processing system 404 may also be any type of data processing system configured to receive such module 402 in a slot or other module receptacle.

In an embodiment, a device 400 is provided. Device 400 includes module 402 configured to connect to a slot 406 of data processing system 404. A set of tabs 408 is connected to module 402 and configured to electrically connect module 402 to slot 406 and to electrically connect module 402 to a clock 418 of data processing system 404. Set of tabs 408 includes a first tab 410, a second tab 412, a third tab 414, and a fourth tab 416. First tab 410 and second tab 412 are opposite third tab 414 and fourth tab 416. First tab 410 comprises a positive type tab, second tab 412 comprises an negative type tab, third tab 414 comprises a positive type tab, and fourth tab 416 comprises an negative type tab. First tab 410 and third tab 414 are configured to provide a first electrical connection 420 to clock 418. Second tab 412 and fourth tab 416 are configured to provide a second electrical connection 422 to clock 418. Together, first, second, third, and fourth tabs, 410, 412, 414, and 416 respectively, comprise two dual tabs.

In an embodiment, the electrical connections between first, second, third, and fourth tabs 410, 412, 414, and 416 to clock 418 may be through slot 406. For example, when module 402 connects to slot 406, a series of connectors in slot 406 may provide the electrical connections from set of tabs 408 to clock 418 or other components of data processing system 404. Thus, in a particular non-limiting embodiment, first connector 420, second connector 422, third connector 424, and fourth connector 426 may be present in slot 406. In this case, when module 402 is inserted into slot 406, first tab 410 may connect to first connector 420, second tab 412 may connect to second connector 422, third tab 414 may connect to third connector 422, and fourth connector 416 may connect to fourth connector 424. In a non-limiting embodiment, to avoid confusion with ordinal terms, first connector 420 may be referred to as a "fifth connector," second connector 422 may be referred to as a "sixth connector," third connector 424 may be referred to as a "seventh connector," and fourth connector 426 may be referred to as an "eighth connector."

Which tab in set of tabs 408 connects to which connector in slot 406 may be varied as needed or desired. Thus, for example, slot 406 may be configured such that fifth and sixth connectors in slot 406 allow a first electrical connection from first and second tabs 410 and 412 to clock 418. Slot 406 may be further configured such that seventh and eighth connectors in slot 406 allow a second electrical connection from third and fourth tabs 414 and 416 to clock 418. Other variations are also possible.

Additionally, one or more electrical connections (not shown) may be established from slot 406 to clock 418 or other components of data processing system 404. In this manner, each tab in set of tabs 408 may have an electrical connection with slot 406 of data processing system 404. However, in other embodiments, different wiring arrangements may be present so that more or fewer tabs are connected to more or fewer components of data processing system 404.

FIG. 5 is an illustration of a slot with surface mount tabs and vias for connection to a module, in accordance with an illustrative embodiment. Slot 500 may be, for example, slot 406 of FIG. 4 and module 514 may be, for example, module 200 of FIG. 2.

Slot 500 may be, in a non-limiting embodiment, a planar board with surface mount tabs 502, 504, 506, and 508. In an embodiment, surface mount tabs 502 and 508 connect to ground, and surface mount tabs 502 and 508 provide an electrical connection when corresponding tabs in the module, described below, are inserted into slot 500. The connection to ground at surface mount tabs 504 and 506 provide for a desirable via and tab isolation with respect to the slot 500. Ellipsis 510 and 512 indicate additional surface mount tabs may be present, possibly repeating the pattern shown in FIG. 5, possibly having different arrangements.

In turn, module 514 may include tabs 516, 518, 520, and 522. Tabs 516 and 522 may also be ground connection tabs that connect to surface mount tabs 502 and 508. Tabs 518 and 520 may provide an electrical connection to surface mount tabs 504 and 506. Vias 524 and 526 may be differential memory interface downstream connections, though may be any convenient electrical wiring that connects to other parts of module 514 (not shown). Vias 524 and 526 may be transmission lines in module 514. Ellipsis 528 and 530 indicate additional tabs may be present, possibly repeating the pattern shown in FIG. 5, possibly having different arrangements.

FIG. 6 is an illustration of a module with tabs and vias, in accordance with an illustrative embodiment. Module 600 may be, in an embodiment, module 514 in FIG. 5. Thus, for example, vias 602 and 604 may correspond to vias 524 and 526 in FIG. 5. Likewise, tabs 606, 608, 610, and 612 may correspond to tabs 516, 518, 520, and 522, respectively, in FIG. 5. Ellipsis 614 and 616 indicate additional tabs may be present, possibly repeating the pattern shown in FIG. 6, possibly having different arrangements.

Tabs 606 and 612 may be grounding tabs, and tabs 608 and 610 may provide an electrical connection when inserted into a slot. In an embodiment, tabs 608 and 610 may provide redundant electrical contacts located directly behind primary front-side contacts (not shown) of module 600. As with the arrangement shown in FIG. 6, the connection to ground at tabs 606 and 612 provide for a desirable via and tab isolation when module 600 is inserted into a slot.

FIG. 7 is an illustration of a module with tabs and vias, in accordance with an illustrative embodiment. Module 700 in FIG. 7 may be in some embodiments module 600 shown in FIG. 6 or module 514 shown in FIG. 5. In an embodiment, tabs 702 and 704 may correspond to tabs 608 and 610 in FIG. 6 or tabs 518 or 520 in FIG. 5, though in FIG. 7 the other redundant pair of tabs, tab 706 and tab 708, may also be seen.

FIG. 7 shows a desirable arrangement of tabs and vias. In particular, an arrangement of two dual tabs is shown in the form of tabs 702, 704, 706, and 708. Tab 702 is opposite tab 706, and tab 704 is opposite tab 708. Tabs 702 and 706 form a first pair, or first subset of tabs. Tabs 704 and 708 form a second pair, or second subset of tabs. As shown by the wiring in FIG. 7, tabs 702 and 706 are connected to via 720 using connections 710, 713, and 712. Tabs 704 and 708 are connected to via 722 using connections 714, 718, and 716. Thus, a first redundant connection is established with respect to tabs 702 and 706. A second redundant connection is established with respect to tabs 704 and 708. Accordingly, a dual redundant contact system is established such that if a failure occurs in one of tab 702 or tab 706, and/or if a failure occurs in one of tab 704 and tab 708, that little or no loss of signal may occur when module 700 is inserted into a slot of a data processing system.

Tabs 702, 704, 706, and 708 may be a variety of different types. In one non-limiting embodiment, each subset of tabs may include two positive type tabs or two negative type tabs. Thus, in a particular non-limiting embodiment, tab 702 may be a positive type tab and tab 706 may be an positive type tab. Likewise, tab 704 may be a negative type tab and tab 708 may be a negative type tab. Although a particular arrangement of positive and negative type tabs is described with respect to FIG. 7, many other arrangements are possible. For example, which tabs are positive or negative type may be varied, and other types of tabs may be used with regard to shape, material, conductivity, and other properties.

Module 700 has been simplified for purposes of clarity. Thus, for example, ground tabs, such as tabs 606 and 612 in FIG. 6, are not shown. Additional tabs are not shown, but may be present. Thus, one or more additional tabs and vias may also be present, possibly a plurality of additional tabs and additional vias may be present. For example, each subset of tabs may include one or more additional tabs. Thus, in a particular non-limiting example, additional opposing tabs (not shown) could be added to the first subset of tabs, including tabs 702 and 706. These additional opposing tabs might connect to via 720, possibly by connection 712, possibly by a connection not shown. Likewise, one or more additional opposing tabs (not shown) could be added to the second subset of tabs, including tabs 704 and 708. These additional opposing tabs might connect to via 722, possibly by connection 716, possibly by a connection not shown. Hence, the arrangements of tabs shown in FIG. 7 is not limiting of the disclosures herein, and many different illustrative arrangements are possible.

Figure 8:
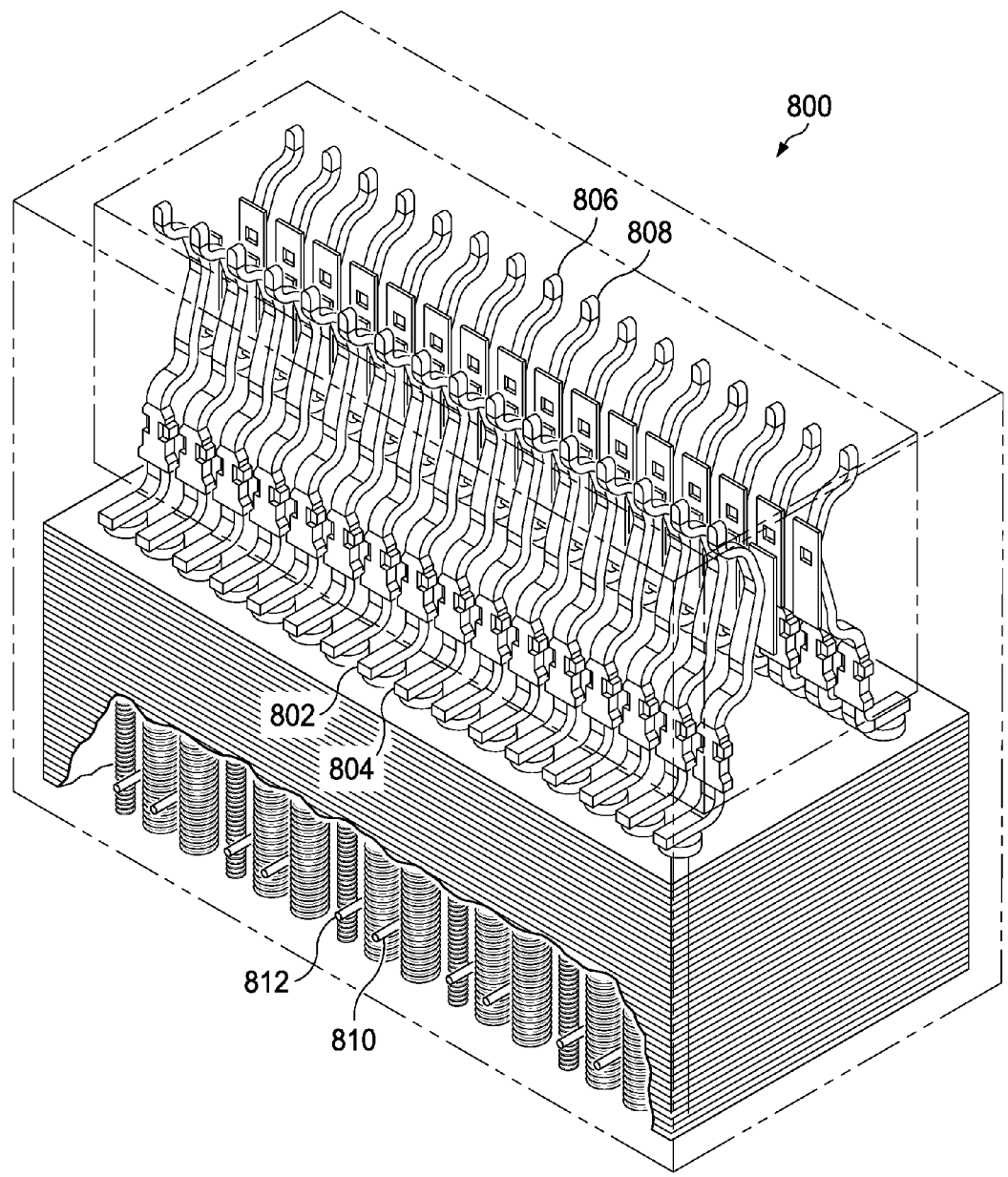
FIG. 8 is an illustration of a slot for connection to a module, in accordance with an illustrative embodiment.

FIG. 8 is an illustration of a slot for connection to a module, in accordance with an illustrative embodiment. Slot 800 may be a more detailed example of slot 500 of FIG. 5, for example. Likewise, tabs 802, 804, 806, and 808 might connect to corresponding tabs of a module, such as for example tabs 702, 704, 706, and 708 of module 700 shown in FIG. 7. Additional tabs to the right and left of tabs 802, 804, 806, and 808 are shown; however, the arrangement of tabs shown in FIG. 8 may be varied as desired.

Ports within slot 800 may receive signals from the corresponding tabs. Thus, for example, port 810 may correspond to tab 804 and port 812 may correspond to tab 802. These ports may carry signals from slot 800 to other parts of a data processing system (not shown).

In an embodiment, tab 802 may receive signals from a positive port at a module, such as module 700 of FIG. 7. These signals may be transferred to port 812, which may be a positive port. Likewise, tab 804 may receive signals from a negative port at a module, such as module 700 of FIG. 7. These signals may be transferred to port 810, which may be a negative port.

Figure 9:
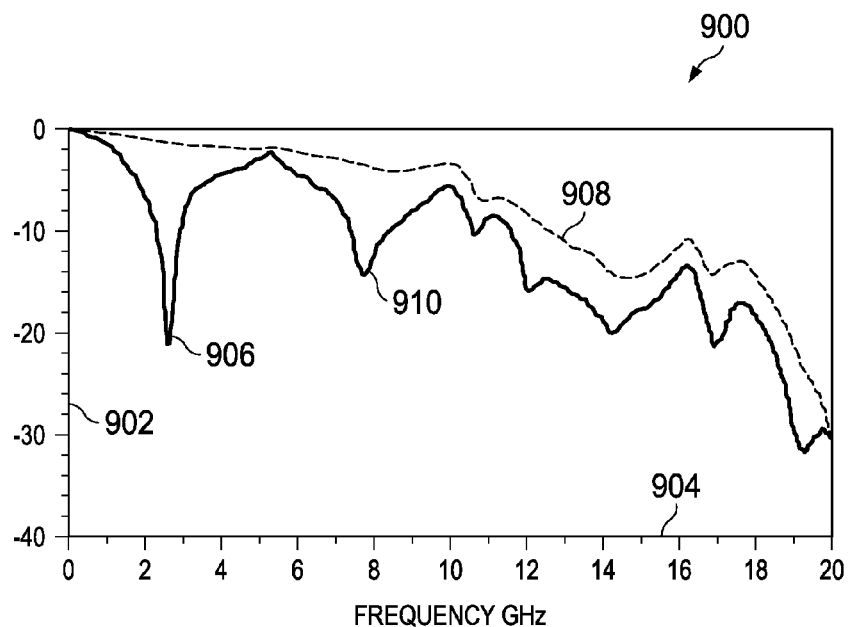
FIG. 9 is a chart illustrating stub resonance between a module and a slot, in accordance with an illustrative embodiment.

FIG. 9 is a chart illustrating stub resonance between a module and a slot, in accordance with an illustrative embodiment. Graph 900 may be a quantitative simulation of communication performance between a module, such as module 514, 600, 700, or 800 of FIGS. 5, 6, 7, and 8, and a slot, such as slot 500 or slot 800 of FIGS. 5 and 8. Although the embodiments described herein may relate to simulations, the data described in any of FIGS. 9 through 15 might be taken from real measurements. The "Y," vertical, axis 902 represents decibels of signal degradation caused as a result of resonance caused by one or more opens between tabs of a slot and a module. The "X," horizontal, axis 904 represents the frequency in gigahertz of the signals between the slot and the module.

FIGS. 9 through 15 make reference to various simulated or possibly measured values. These values are all approximate only, and further may have different values for different implementations. Thus, in a non-limiting example, "1.2 gigahertz" may be read as "about 1.2 gigahertz, which value might be varied depending on implementation."

In the case of failure of one or more of the tabs, Graph 900 assumes that at least one contact is open among the two paired contacts. In the embodiment shown in FIG. 9, at least one open contact reacts as a stub. The open may be on a module tab, which has experienced perhaps corrosion. The open may lead to a stub resonance at around 3 gigahertz, as shown at point 906. In other words, at a signal exchange rate of 3 gigahertz, a resonance may occur which results in a 20 decibel dip in signal transmission performance. This dip in signal transmission performance may be undesirable.

FIG. 9 shows two sets of lines. Upper line 908 represent a case where no open occurs. Lower line 910 represents a case where an open occurs with respect to at least one tab.

Figure 10:
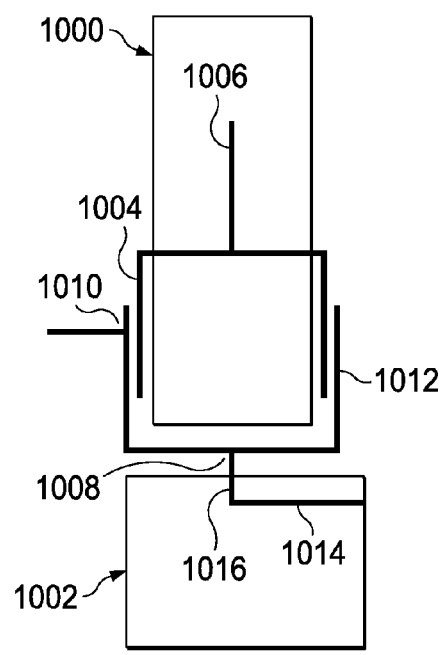
FIG. 10 is an illustration of a block diagram of a module and slot system, in accordance with an illustrative embodiment.
Figure 11:
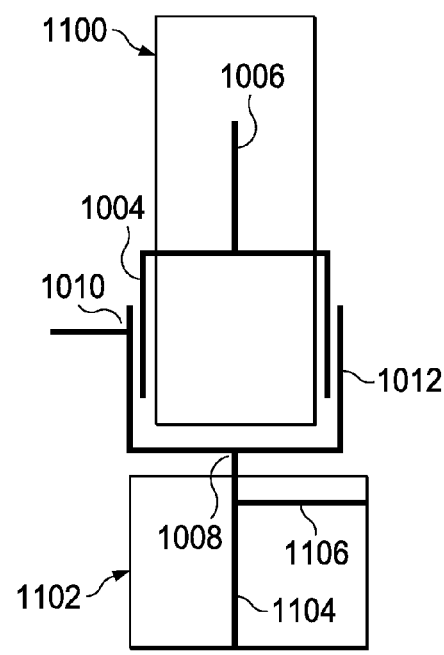
FIG. 11 is an illustration of a block diagram of a module and slot system, in accordance with an illustrative embodiment.
Figure 12:
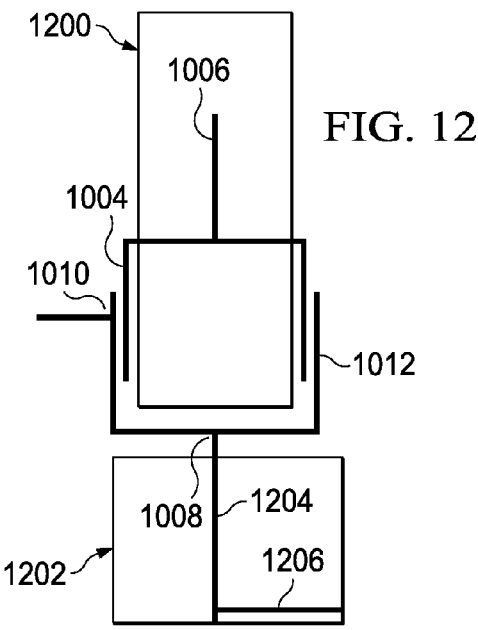
FIG. 12 is an illustration of a block diagram of a module and slot system, in accordance with an illustrative embodiment.

Graph 900 demonstrates that electrical open in a redundant tab/slot system, such as shown in FIGS. 5 through 8, may cause undesirable loss of signal. Thus, additional techniques may be used to further reduce signal resonance and improve failover efficiency in the case of an open between a module and a tab. FIGS. 10 through 12 describe such embodiments.

FIG. 10 is an illustration of a block diagram of a module and slot system, in accordance with an illustrative embodiment. FIG. 11 is an illustration of a block diagram of a module and slot system, in accordance with an illustrative embodiment. FIG. 12 is an illustration of a block diagram of a module and slot system, in accordance with an illustrative embodiment. FIGS. 10 through 12 illustrate different arrangements of modules and slots. Thus, FIGS. 10 through 12 use common reference numerals to refer to similar objects having similar functions. Modules 1000, 1100, and 1200 in FIGS. 10 through 12 may each correspond to any of modules 500, 600, 700, or 800 in FIGS. 5 through 8. Similarly, slots 1002, 1102, and 1202 FIGS. 10 through 12 may each correspond to any of slots 514 or 800 shown in FIG. 5 or 8. The arrangements of slots and modules shown in FIGS. 10 through 12 may be used to mitigate the resonance issue described with respect to FIG. 9 when an open occurs along either side of module contact regions 1010 and 1012.

FIG. 10 illustrates a possible arrangement of module 1000 and slot 1002. Module 1000 includes printed wiring board pad 1004 (also present on modules 1100 and 1200 of FIGS. 11 and 12). Printed wiring board pad 1004 further includes wiring 1006 (also present on modules 1100 and 1200 of FIGS. 11 and 12). Wiring 1006 may serve as a differential memory interface module transmission line, though other such lines and other transmission lines may also be present. Module 1000 may also include surface transmission line 1008. Surface transmission line 1008 may include module contact regions 1010 and 1012. One or more surface transmission lines and associated module contact regions also may be present on modules 1100 and 1200 of FIGS. 11 and 12.

Slot 1002 includes wiring 1014. Wiring 1014 may be, in a non-limiting embodiment, a differential memory interface transmission line for a data processing system, though may be any kind of wiring. Wiring 1014 allows signals to travel between module 1000 and slot 1002 when module 1000 is connected to slot 1002.

In the embodiment shown in FIG. 10, wiring 1014 is located in an upper layer of slot 1002, relative to an opening of the slot which may receive module 1000. For example, slot 1002 may include a plurality of layers, some of which are closer to the opening of the slot and some of which are closer to the bottom of the slot. The opening of the slot is in the upper layers and the bottom of the slot is in the lower layers. Wiring 1014 may advantageously be located in one or more of the upper layers relative to the opening, as shown in FIG. 10.

In addition, in an embodiment, slot 1002 may be back drilled such that the stub of a plate through hole via 1016 is absent from slot, or partially absent from slot 1002. Removing the stub of a plate through hole via 1016 may further decrease any undesirable signal resonance, such as shown in FIG. 9, which may arise due to an open in one or more tabs of module 1000 or slot 1002.

Turning now to FIG. 11, a similar arrangement of module 1100 and slot 1102 is shown relative to the arrangement shown in FIG. 10. However, in this case, no back drilling has been performed. Thus, plate through hole via 1104 may extend through or partially through slot 1102. Nevertheless, as with the embodiment shown in FIG. 10, wiring 1106 is disposed in one or more of the upper layers of slot 1102. The embodiment shown in FIG. 11 may also be an illustrative arrangement for minimizing undesirable signal resonance, such as shown in FIG. 9, that may arise due to an open in one or more tabs of module 1100 or slot 1102.

Turning now to FIG. 12, a similar arrangement of module 1200 and slot 1202 is shown relative to the arrangement shown in FIG. 10. However, in this case, no back drilling has been performed. Thus, plate through hole via 1204 may extend through or partially through slot 1202. However, unlike the embodiments shown in FIGS. 10 and 11, wiring 1206 is now disposed in one or more of bottom layers of slot 1202. The embodiment shown in FIG. 12 may also be an illustrative arrangement for minimizing undesirable signal resonance, such as shown in FIG. 9, that may arise due to an open in one or more tabs of module 1200 or slot 1202.

The different arrangement shown in FIGS. 10 through 12 may be applied in different designs or arrangements or uses for modules and/or slots. In each of the cases shown in FIGS. 10 through 12, signal resonance is determined primarily by the corresponding module, not board thickness of the corresponding slot.

Still other arrangements of the wiring and plate through hole vias of either modules or slots may be used. Thus, the embodiments shown in FIGS. 10 through 12 should not be considered limiting to the disclosures herein.

Figure 13:
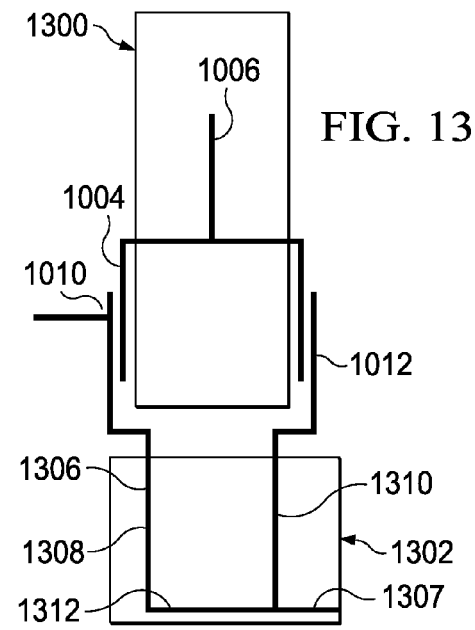
FIG. 13 is an illustration of a block diagram of a module and slot system, in accordance with an illustrative embodiment.

FIG. 13 is an illustration of a block diagram of a module and slot system, in accordance with an illustrative embodiment. FIG. 13 uses reference numerals common to FIGS. 10 through 12 to refer to similar objects having similar functions. Modules 1000, 1100, and 1200 in FIGS. 10 through 12 may each correspond to module 1300 of FIG. 13. Similarly, slots 1002, 1102, and 1202 of FIGS. 10 through 12 may each correspond to slot 1302 of FIG. 13. Similarly, module 1300 may include wiring 1006, printed wiring board pad 1004, and module contact regions 1010 and 1012. Plate through hole via 1306 and 1310 are also present. The arrangements of slot 1302 and module 1300 shown in FIG. 13 may be used to demonstrate the resonance issue described with respect to FIG. 9.

A difference between the module/slot arrangement in FIG. 13 compared to those module/slot arrangements shown in FIGS. 10 through 12 is in transmission line 1307. Transmission line 1307 might, in a non-limiting embodiment, be a differential memory interface transmission line. However, transmission line 1307 extends through both upper and lower layers of slot 1302, such as for example at line portions 1308, 1310, and 1312. Line portions 1308 and 1310 extend vertically through one or more of the upper and lower layers of slot 1302. Line portion 1312 extends horizontally through one or more lower layers of slot 1302. In this arrangement, the resonance may be set by module 1300 as well as a thickness of slot 1302.

In one non-limiting embodiment, though not necessarily all embodiments, this arrangement might be avoided. When a signal is routed through one or more bottom layers of slot 1302, undesirable resonance might possibly arise in the signal. This result might occur in cases where long paths might result in longer stubs, resulting in lower resonance frequencies with respect to a fundamental frequency in the signal. Thus, in some non-limiting embodiments, the module/slot and wiring arrangements shown in FIGS. 10 through 12 might be preferred over the arrangement shown in FIG. 13.

Figure 14:
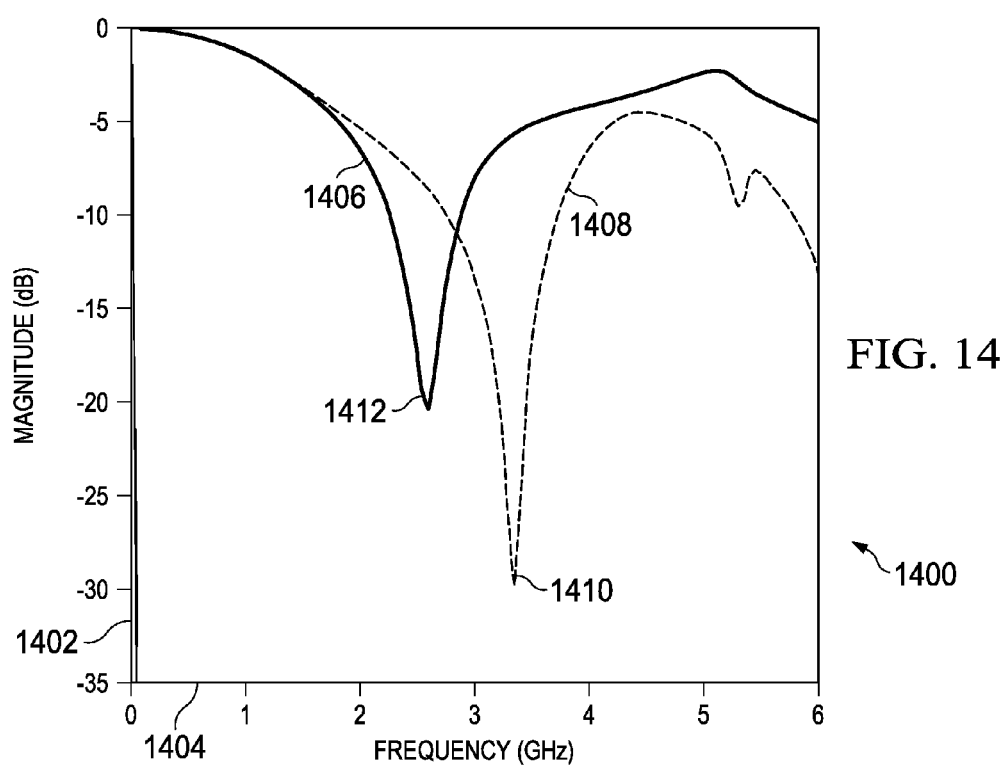
FIG. 14 is a chart illustrating stub resonance between a module and a slot for two different slot and module configurations, in accordance with an illustrative embodiment.

FIG. 14 is a chart illustrating stub resonance between a module and a slot for two different slots and module configurations, in accordance with an illustrative embodiment. Graph 1400, like graph 900 of FIG. 9, may represent a quantitative simulation of communication performance between a module, such as module 514, 600, 700, or 800 of FIGS. 5, 6, 7, and 8, and a slot, such as slot 500 or slot 800 of FIGS. 5 and 8. The "Y," vertical, axis 1402 represents decibels of signal degradation caused as a result of resonance caused by one or more opens between tabs of a slot and a module. The "X," horizontal, axis 1404 represents the frequency in gigahertz of the signals between the slot and the module.

Line 1406 represents a quantitative simulation of signal loss in decibels versus frequency of the signal for a module, slot, and wiring arrangement shown in FIG. 13. Line 1408 represents a quantitative simulation of signal loss in decibels versus frequency of the signal for a module, slot, and wiring arrangement shown in FIG. 11. As can be seen in FIG. 14, a larger signal loss might occur at peak 1410 along line 1408 relative to peak 1412 along line 1406. However, the resonance frequency of line 1408 is pushed to a higher frequency relative to line 1406. This resonance frequency push from line 1406 to line 1408 may result from reducing the length of the stubs by locating connection wiring in upper layers of the slot.

In an embodiment, the slot/module arrangement may be configured such that the peak resonance may be pushed beyond a fundamental frequency of a clock of the data processing system connected to the slot. Thus, even when resonance occurs as a result of an open, there is less of an undesirable impact on performance with respect to timing among the module and the rest of the data processing system. In this manner, the arrangements shown in FIGS. 10 through 12 may further reduce the undesirable effects of an open.

FIG. 15 is a table illustrating a summary of clock jitter results and vertical swings for two different slot and module configurations. Specifically, table 1500 reflects a series of quantitative simulations with respect to the module, slot, and wiring arrangements shown with respect to FIG. 5 and FIG. 7. The columns labeled "minstub" refer to simulations performed with respect to the arrangement shown in FIG. 13, whereas the columns labeled "maxstub" refer to simulations performed with respect to the arrangement shown in FIG. 11. The results for "minstub" versus "maxstub" are different because the "minstub" includes the board thickness of the slot as part of the total stub length, and therefore influences the resonance frequency. The "minstub" configuration of FIG. 13 represents a longer effective stub relative to the "maxstub" configuration of FIG. 11. Therefore, the configuration shown in FIG. 13 may not perform as well as the configuration shown in FIG. 11.

Note that all of the values shown in table 1500 are for a particular non-limiting embodiment. Additionally, all of the values shown in table 1500 are approximate only. All of the values shown in table 1500 may vary depending on the exact design parameters of the module, slot, and associated wiring being tested.

The first four columns indicated at section 1502 represent simulations of a 1.2 gigahertz showcase, where the stub resonance at 3 gigahertz does not influence clock jitter and vertical swing. The second four columns indicated at section 1504 represent simulations of a 2.4 gigahertz case where the eye is distorted significantly because the 3 gigahertz resonance attenuates fundamental parts of the signal. As used herein, the term "eye" refers to a matrix used to evaluate a quality of the opening of the signal, and sometimes might be referred to as an "eye diagram." An "eye" may be a "vertical eye" (VEYE) or a "horizontal eye" (HEYE). Returning to FIG. 15, the last four columns at section 1506 represent simulations of a 3.2 gigahertz case, where also the eye is distorted significantly because the 3 gigahertz resonance attenuates fundamental parts of the signal. The numbers in the columns represent clock jitter results and vertical swing.

The rows represent different simulations of different parameters. Row 1508 represents a good single tab for a clock arrangement "A" connected to the slot of a data processing system. Clock arrangement "A" is not shown. Row 1510 represents a good single tab for a clock arrangement "B" connected to the slot of the data processing system. Row 1512 represents a good double tab for the clock arrangement "A". Clock arrangement "B" is not shown. Row 1514 represents a good double tab for the clock arrangement "B". Row 1516 represents an open double tab for both legs for the clock arrangement "A". Row 1518 represents an open double tab for both legs for the clock arrangement "B". Row 1520 represents an open double tab for one leg of the clock arrangement "A". Row 1522 represents an open double tab for one leg of the clock arrangement "B". Row 1524 represents a one ohm contact double tab for both legs of the clock arrangement "A". Row 1526 represents a one ohm contact double tab for both legs of the clock arrangement "B". Row 1528 represents a fifty ohm contact double tab for both legs of the clock arrangement "A". Row 1530 represents a fifty ohm contact double tab for both legs of the clock arrangement "B".

The embodiments described herein solve the issues of opens and resonance frequencies interfering with signals and clock jitter. The embodiments described herein contemplate designing the packaging of a clock net in an exact manner such that when resonance frequencies do arise, such resonance frequencies avoid the fundamental frequencies of the clock. In an embodiment, the speed of a clock might be limited to about 2.4 gigahertz. This arrangement operates desirably for systems that use uplifting with phase lock loops (PLLs). The embodiments herein may apply to designs such as double data rate-3 (DDR3) memory modules, DDR4 memory modules, quick path interconnect (QPI) busses, various servers or insertable servers, Z360 differential memory interfaces (DMIs), A busses at 6.4 gigabits, as well as future graphics double data rate (GDDR) memory modules and other technologies. For speeds faster than about 2.4 gigabits to 4.8 gigabits, a quad data rate (QDR) clock may be used, such as, for example, for speeds in the range of 4.8 gigabits to 9.6 gigabits. For higher speeds, a higher phase lock loop (PLL) multiplier may be used.

Thus, illustrative embodiments provide a module which is configured to connect to a slot of a data processing system. A set of tabs is connected to the module and configured to electrically connect the module to the slot and to electrically connect the module to a clock of the data processing system. The set of tabs includes a first tab, a second tab, a third tab, and a fourth tab. The first tab and the second tab are opposite the third tab and the fourth tab. The first tab comprises a positive type tab, the second tab comprises an negative type tab, the third tab comprises a positive type tab, and the fourth tab comprises an negative type tab. The first and third tabs are configured to provide a first electrical connection to the clock. The second and fourth tabs are configured to provide a second electrical connection to the clock. Together, the first, second, third, and fourth tabs comprise two dual tabs.

The embodiments may have a number of advantages. For example, the embodiments disclosed herein may replace a complete dual point to point clock path that has a very complex failover mechanism with a single clock path that has precise net rules that, when a module tab open occurs, allows a clock signal to continue to propagate. Additionally, other signal propagation between a module and a slot may be advantageously increased. Yet further, when an open occurs between a module and a slot, signal degradation may be minimized.

The terminology used herein is for the purpose of describing particular embodiments only and is not intended to be limiting of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the claims in the form disclosed. Many modifications and variations will be apparent to those of ordinary skill in the art without departing from the scope and spirit of the claims. The embodiment was chosen and described in order to best explain the principles of the claims and the practical application, and to enable others of ordinary skill in the art to understand the claims for various embodiments with various modifications as are suited to the particular use contemplated.

What is claimed is:

1. A device comprising:
   a module configured to connect to a slot of a data processing system; and
   a set of tabs connected to the module and configured to electrically connect the module to the slot and to electrically connect the module to a clock of the data processing system;
   wherein the set of tabs comprises:
      a first tab;
      a second tab;
      a third tab; and
      a fourth tab, wherein the first tab and the second tab are opposite the third tab and the fourth tab, wherein the first tab comprises a positive type tab, the second tab comprises an negative type tab, the third tab comprises a positive type tab, and the fourth tab comprises an negative type tab, wherein the first and third tabs are configured to provide a first electrical connection to the clock, wherein the second and fourth tabs are configured to provide a second electrical connection to the clock, and wherein together the first, second, third, and fourth tabs comprise two dual tabs.

2. The device of claim 1, wherein the first tab and the third tab are configured to connect to a first via of the slot, and wherein the second tab and the fourth tab are configured to connect to a second via of the slot.

3. The device of claim 1 further comprising:
   at least one additional set of tabs configured to electrically connect the module to the clock.

4. The device of claim 1, wherein the first and third tabs comprise a first tab subset, wherein the second and fourth tabs comprise a second tab subset, wherein the first tab subset comprises at least one additional tab, and wherein the second tab subset comprises another at least one additional tab.

5. The device of claim 1, wherein the module is further configured to electrically connect to wiring disposed in an upper layer of the slot, relative to an opening of the slot.

6. A device comprising:
   a bus;
   a processor connected to the bus;
   a clock connected to the bus; and
   a slot connected to at least one of the processor, the clock, and the bus, the slot configured with a first via and a second via, wherein the slot is further configured to receive a module comprising two dual tabs, wherein the slot is further configured to receive the two dual tabs that comprise:
      a first tab;
      a second tab;
      a third tab; and
      a fourth tab;
      wherein the first tab and the second tab are opposite the third tab and the fourth tab, wherein the first tab comprises a positive type tab, the second tab comprises a negative type tab, the third tab comprises a positive type tab, and the fourth tab comprises a negative type tab;
   wherein the slot is further configured to receive the two dual tabs such that the first tab and the third tab connect to the first via;
   wherein the slot is further configured to receive the two dual tabs such that the second tab and the fourth tab connect to the second via;
   wherein the slot is further configured such that first and second connectors in the slot allow a first electrical connection from the first and second tabs to the clock; and
   wherein the slot is further configured such that third and fourth connectors in the slot allow a second electrical connection from the third and fourth tabs to the clock.

7. The device of claim 6, wherein the slot is further configured such that wiring in the slot that is configured to receive signals from the module is disposed in an upper layer of the slot, relative to an opening of the slot.

8. The device of claim 7, wherein the slot has been back drilled such that a plate through hole via is at least partially absent from the slot.

9. The device of claim 6, wherein the slot is further configured such that wiring in the slot that is configured to receive signals from the module is disposed below an upper layer of the slot, relative to an opening of the slot, and wherein a differential memory interface transmission line within the slot, connected to the wiring, takes a minimum path distance out of the slot.

10. The device of claim 6, wherein wiring in the slot that is configured to receive signals from the module is further configured so as to avoid a lower layer of the slot, relative to a surface transmission line of the slot.

11. The device of claim 6, wherein wiring in the slot that is configured to receive signals from the module is further configured to take a minimum path distance out of the slot.

12. The device of claim 6 wherein wiring in the slot that is configured to receive signals from the module is disposed within a lower layer of the slot, relative to an opening of the slot.

13. A data processing system comprising:
a bus;
a processor connected to the bus;
a clock connected to the bus; and
a slot connected to at least one of the processor, the clock, and the bus, the slot configured with a first via and a second via;
a module comprising two dual tabs inserted into the slot, the module comprising:
a first tab;
a second tab;
a third tab; and
a fourth tab;
wherein the first tab and the second tab are opposite the third tab and the fourth tab, wherein the first tab comprises a positive type tab, the second tab comprises a negative type tab, the third tab comprises a positive type tab, and the fourth tab comprises a negative type tab;
wherein the first tab and the third tab connect to the first via;
wherein the second tab and the fourth tab connect to the second via;
wherein first and second connectors in the slot electrically connect the first and second tabs to the clock; and
wherein third and fourth connectors in the slot electrically connect the third and fourth tabs to the clock.

14. The data processing system of claim 13, wherein wiring in the slot is configured to receive signals from the module, and wherein the wiring is disposed in a location selected from the group consisting of: an upper layer of the slot, relative to an opening of the slot, and a lower layer of the slot, relative to an opening of the slot.

15. The data processing system of claim 14, wherein the slot has been back drilled such that a plate through hole via is at least partially absent from the slot.

16. The data processing system of claim 13, wherein wiring in the slot is configured to receive signals from the module, and wherein the wiring is disposed below an upper layer of the slot, relative to an opening of the slot, and wherein a differential memory interface transmission line within the slot, connected to the wiring, takes a minimum path distance out of the slot.

17. The data processing system of claim 13, wherein wiring in the slot that is configured to receive signals from the module is further configured so as to avoid a lower layer of the slot, relative to a surface transmission line of the slot.

18. The data processing system of claim 13, wherein wiring in the slot that is configured to receive signals from the module is further configured to take a minimum path distance out of the slot.

19. The data processing system of claim 13 further comprising:
at least one additional set of tabs connected to the module and inserted into the slot, the at least one additional set of tabs electrically connecting the module to the clock.

20. The data processing system of claim 13, wherein the first and third tabs comprise a first tab subset, wherein the second and fourth tabs comprise a second tab subset, wherein the first tab subset comprises at least one additional tab, and wherein the second tab subset comprises another at least one additional tab.

* * * * *